June 30, 1925.
M. CASTRICUM
PREPARING CORD FABRIC
Filed July 7, 1920
1,544,217
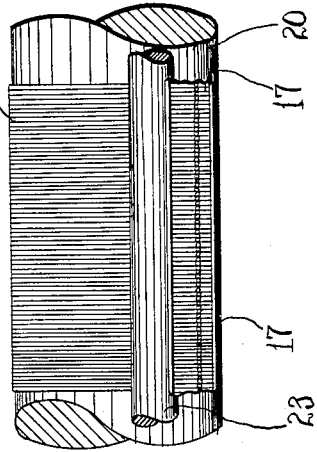
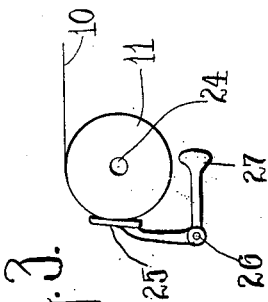
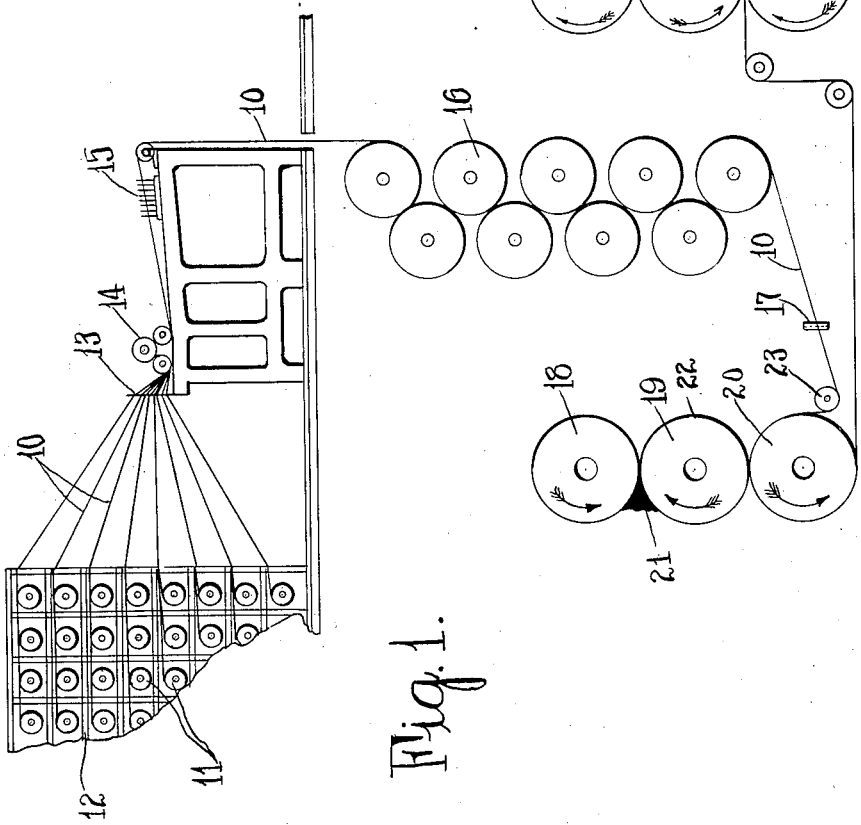
INVENTOR
Martin Castricum.
BY
Edward C. Taylor
ATTORNEY Patented June 30, 1925.

1,544,217

UNITED STATES PATENT OFFICE.

MARTIN CASTRICUM, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

PREPARING CORD FABRIC.

Application filed July 7, 1920. Serial No. 394,566.

*To all whom it may concern:*

Be it known that I, MARTIN CASTRICUM, a citizen of the United States of America, residing at Springfield, in the county of Hampden and State of Massachusetts, have invented certain new and useful Improvements in Preparing Cord Fabric, of which the following is a specification.

My invention relates to the uniting of unconnected parallel cords with rubber, or, in other words, to the manufacture of what is known as weftless cord fabric.

It has for its object a commercial method by which the separate cords may be mechanically coated with rubber without the necessity of temporarily uniting them with light weft threads as was required in one prior process, or of incorporating additional ingredients or performing additional steps as was required in that and other processes.

Briefly stated, my invention consists, in one feature thereof, in the following procedure. A plurality of unconnected cords are drawn from a supply under equal tensions, arranged in parallel relation, and led to a calender, which may be of the usual three-roll type. Preferably, the cords are passed through a heating apparatus so that the cords are prepared to receive the application of rubber in the best manner.

The treatment of the cords as they pass through the first calendering operation forms a material part of my present invention and deserves especial consideration. The cords are arranged in parallel relation in any suitable manner, and are brought to the calender in this condition. It is extremely important to preserve the cords in this relation during their passage through the calender. I have found that this result can be secured by holding the cords firmly against one calender roll throughout a substantial arc prior to their passage between that roll and the adjacent one carrying the rubber sheet, said arc being sufficient to cause the tension of the cords to hold them against displacement upon the calender roll during the coating operation. I have found, also, that if there is no substantial difference in speed between the cords and the rubber—in other words, if the first coating is a "skim" instead of a "friction"—the cords will be held in their parallel relation and can later be subjected to a frictioning process without danger of distortion. The combined effect of the steps outlined is to coat the cords while the latter are held under substantially equal tensions and in parallel relation; to press the rubber thoroughly between the cords so that individual cords are encased and completely covered by rubber, and so that the cords are spaced uniformly in the sheet with the space between adjacent cords entirely filled by rubber; and to accomplish these results without the use of weft threads or rubber solvents.

My invention will now be described with particular reference to the accompanying drawings, in which—

Fig. 1 is a diagrammatic elevation of an arrangement of devices whereby my improved method may be carried out;

Fig. 2 is an enlarged detail showing the method of feeding the cords through the calender; and Fig. 3 is a detail showing one means of tensioning the individual cords.

I have shown in the drawings the cords 10 being led from tubes or spools 11 on a creel 12, the separate spools being subjected to individual tensions in any desired or preferred manner. From the creel the cords are led through guides 13, through tension rolls 14, and through a comb 15 which serves to arrange the cords in parallel relation. The above apparatus may be located conveniently on one floor of a building and the apparatus about to be described located on a lower floor, as this saves considerable floor space and provides a short and direct path for the cords. After the cords are arranged in adjacent parallel relation by the above mechanism they pass through a heating mechanism illustrated conventionally at 16, which serves to prepare the cords to take the subsequent coating of rubber in the best manner.

After they pass the heater the cords are led through a reed or comb 17, which serves to correct any displacement of the cords from their parallel relation. The cords are now ready to undergo the calendering operation. A calender has been conventionally shown with rolls 18, 19, and 20, between the upper two of which a bank of rubber 21 is worked into a sheet 22. This sheet passes around the middle roll 19, and between that and the bottom roll, where it meets the cords fed to it as described below. The sheet of unconnected parallel cords is directed by a guide roll 23 into contact with the lower roll at a point separated by a substantial arc from the bight of the lower two rolls. As the cords are under tension, this substantial arc of contact serves to effectively hold the cords in their parallel relation against the lower roll, so that the application of the rubber will not disturb the location of the cords. The arc of contact is preferably in the neighborhood of ninety degrees, so that ample provision is made to hold the cords against lateral displacement. Preferably in order to insure that the tension on the cords is maintained, so that the cords are pressed firmly against the calender roll, the rolls 16 are positively driven at a slightly lower surface speed than that of the calender.

As stated above, this calendering operation is preferably carried out so that the rubber is pressed on to the cords as a skim coat rather than being frictioned. The term " frictioning " is well understood in the art as referring to a calendering step in which the rubber is applied to the cords with a difference of surface speeds between the two, whereby the rubber is ground and worked into and between the cords. After the cords have received this skim coating they are in the form of a sheet or web held together by the rubber. This web is now preferably frictioned on the opposite side to the first coating, working the rubber thoroughly between the cords. This operation may be performed in a calender of the usual type shown conventionally in Fig. 1 at 30, and may follow directly upon the first coating operation or may be carried out at a later time. If desired, a skim coat may be applied over the friction coat.

In Fig. 3 I have shown conventionally a form of device for securing uniform tension on the separate cords. The cord 10 is drawn from a spool 11 mounted to rotate freely upon an arbor 24. Tension is imparted to the cord by a paddle or friction 25 pivoted at 26 and pressed against the spool by a weight 27 so mounted that the tension will be substantially uniform irrespective of the variation in the size of the spool as cord is withdrawn.

I claim:

1. The method of uniting cords into a weftless cord fabric on a three-roll calender consisting in sheeting rubber betwen two of the rolls and carrying the sheet between the middle roll and the third roll, and directing a series of parallel unconnected cords under tension against the third roll at a point spaced from the line of contact of such roll with the middle roll, by an arc sufficient to maintain the cords in parallel relation during their passage between the middle and third rolls.

2. The method of uniting cords into a weftless cord fabric consisting in providing two calender rolls, leading a sheet of rubber into the bight of such rolls, directing a series of unconnected cords under tension in parallel relation against one of said rolls at a point spaced from the line of contact of the rolls by an arc sufficient to maintain the cords against displacement, and carrying the cords through the bight of the rolls.

3. The method of uniting unconnected cords and rubber into sheet forms comprising providing a pair of calender rolls, leading a sheet of rubber around one of said rolls and through the bight of the rolls, separately tensioning a plurality of cords, arranging said cords in parallel relation, and passing said cords around an arc of the surface of the second roll sufficient to maintain the cords against displacement and between the bight of said rolls, whereby the cords are firmly held against displacement during the coating operation.

4. The method of uniting unconnected cords and rubber into sheet form comprising providing a pair of calender rolls, leading a sheet of rubber around one of said rolls and through the bight of the rolls, separately tensioning a plurality of cords, arranging the cords in parallel relation, heating the cords, carrying the cords around the second roll through an arc of its surface sufficient to maintain the cords against displacement and through the bight of said rolls, and positively controlling the linear speed of the cords during the heating and coating operations so that the tension of the cords is maintained.

5. The method of intimately uniting rubber and unconnected cords into sheet form which consists in arranging said cords in parallel relation under equal tensions, heating them, applying a skim coat of rubber to form the sheet while the cords are hot and held in parallel relation, and then frictioning said sheet to completely cover the cords and cause complete contact of the cords with the rubber in the sheet.

6. The method of uniting unconnected cords into a weftless cord fabric consisting in providing two smooth-surfaced calender rolls, arranging and holding the cords in parallel relation on one of the rolls, and with the other roll pressing a sheet of rubber against the cords with the same peripheral speed as the speed with which the cords are moving.

7. The method of uniting cords into a weftless cord fabric comprising arranging a series of unconnected cords in parallel relation under individually equal tensions, pressing the cords while held in such relation against a sheet of rubber moving at the same surface speed as the cords, and frictioning additional rubber into the other side of the cords.

8. The method of uniting unconnected cords into a weftless cord fabric consisting in leading the cords from separate sources of supply under individual tensions, arranging the cords in parallel relation, heating the cords, and then applying to the cords a coating of rubber without longitudinal slip between the rubber and the cords.

9. An apparatus for uniting cords into a weftless cord fabric including a pair of calender rolls, means for presenting a sheet of rubber into the bight of such rolls, and means for presenting a plurality of cords in parallel relation and directing them into contact with one of the calender rolls at a point spaced from the line of contact of the rolls by an arc sufficient to maintain the cords against displacement.

10. An apparatus for uniting cords into a weftless cord fabric including a pair of calender rolls, means for presenting a sheet of rubber into the bight of such rolls, a supply for a plurality of cords, means adjacent one of the rolls for arranging the cords in parallel relation, and means for directing the cords so arranged into contact with said roll at a point spaced from the line of contact of the rolls by a distance sufficient to maintain the cords against displacement.

11. An apparatus for uniting cords into a weftless cord fabric including a pair of calender rolls, means for leading a sheet of rubber into contact with one of said rolls and between the bight of said rolls, a supply for a plurality of cords, a comb adjacent the other roll for arranging the cords in parallel relation, and a roll constructed and arranged to direct the cords so arranged into contact with the second named roll at a point spaced from the line of contact of the rolls by a distance sufficient to maintain the cords against displacement.

12. An apparatus for uniting cords into a weftless cord fabric including a three roll calender, of which the middle roll coacts with one end roll to form a sheet of rubber, and coacts with the other end roll to unite the sheeted rubber with the cords, a supply for a plurality of cords, and means for arranging the cords in parallel relation and pressing them against the second-named end roll at a point spaced by an arc of at least ninety degrees from the line of contact of that roll with the middle roll.

13. An apparatus for uniting cords into a weftless cord fabric including a three roll calender, of which the middle roll coacts with one end roll to form a sheet of rubber, and coacts with the other end roll to unite the sheeted rubber with the cords, the middle roll and the second-named end roll being driven at the same peripheral speed, a supply for a plurality of cords, and means for arranging the cords in parallel relation and pressing them against the second-named end roll at a point spaced by an arc of at least ninety degrees from the line of contact of that roll with the middle roll.

14. An apparatus for uniting unconnected cords into a weftless cord fabric, including means to supply each cord under an individual tension, means to arrange the cords in parallel relation, a calender having rolls for forming a sheet of rubber and a roll for pressing the cords against the sheet of rubber so formed, and means for pressing the cords in parallel relation against said last-named roll at a point separated from the point of contact of such roll with the sheet of rubber by an arc sufficient to maintain the cords against displacement, all of said devices being constructed and arranged to permit of uninterrupted and continuous travel of the cords.

15. An apparatus for uniting unconnected cords into a weftless cord fabric including means to supply each cord under a uniform individual tension, means to arrange the cords in parallel relation, means for heating the cords, a calender having rolls for forming a sheet of rubber, and a roll for pressing the cords against the sheet of rubber so formed at the same peripheral speed as that of the sheet of rubber, and means for pressing the cords in parallel relation against said last-named roll at a point separated from the point of contact of such roll with the sheet of rubber by an arc sufficient to maintain the cords against displacement, all of said devices being constructed and arranged to permit of uninterrupted and continuous travel of the cords, and to maintain the cords under tension.

16. An apparatus for uniting unconnected cords into a weftless cord fabric including means to supply each cord under a uniform individual tension, means to arrange the cords in parallel relation, means for heating the cords, a calender having rolls for forming a sheet of rubber, and a roll for pressing the cords against the sheet of rubber so formed at the same peripheral speed as that of the sheet of rubber, and means for pressing the cords in parallel relation against said last-named roll at a point separated from the point of contact of such roll with the sheet of rubber by an arc sufficient to maintain the cords against displacement, all of said devices being constructed and arranged to permit of uninterrupted and continuous travel of the cords, and to maintain the cords under tension, and said calender being positively driven at a slightly higher speed than the said drying means.

17. In an apparatus for producing weftless cord fabric, a pair of calender rolls; a supply for a series of parallel cords; and means for directing the cords to the calender comprising a smooth-surfaced member arranged to direct the cords into contact with one of the calender rolls at a point spaced from the line of contact of the rolls by an arc sufficient to maintain the cords against displacement, and a device positioned between said member and the supply for arranging the cords on said member in parallel relation.

MARTIN CASTRICUM.